(12) United States Patent
Buttler

(10) Patent No.: US 6,782,763 B2
(45) Date of Patent: Aug. 31, 2004

(54) PROPANE MEASUREMENT USING A CORIOLIS FLOWMETER

(75) Inventor: Marc Allan Buttler, Estes Park, CO (US)

(73) Assignee: Micro Motion, Inc., Boulder, CO (US)

( * ) Notice: Subject to any disclaimer, the term of this patent is extended or adjusted under 35 U.S.C. 154(b) by 6 days.

(21) Appl. No.: 10/255,481

(22) Filed: Sep. 26, 2002

(65) Prior Publication Data

US 2004/0060368 A1 Apr. 1, 2004

(51) Int. Cl.⁷ .................................................. G01F 1/78
(52) U.S. Cl. .................................................. 73/861.355
(58) Field of Search ..................... 73/861.355, 861.356, 73/861.357

(56) References Cited

U.S. PATENT DOCUMENTS

| | | | |
|---|---|---|---|
| 3,588,481 A | | 6/1971 | Stroman |
| 4,238,825 A | | 12/1980 | Geery |
| 4,872,351 A | | 10/1989 | Ruesch |
| 5,821,406 A | * | 10/1998 | Ridgeway et al. ......... 73/53.05 |
| 6,178,510 B1 | | 1/2001 | O'Connor et al. |

FOREIGN PATENT DOCUMENTS

| | | |
|---|---|---|
| EP | 0 074 164 A1 | 3/1983 |
| EP | 0 828 142 A2 | 3/1998 |
| WO | WO 95/30196 A1 | 11/1995 |

\* cited by examiner

*Primary Examiner*—Edward Lefkowitz
*Assistant Examiner*—Jewel V. Thompson
(74) *Attorney, Agent, or Firm*—Duft Setter Ollila & Bornsen LLC

(57) ABSTRACT

A method of delivering propane to a customer is disclosed. A transport vehicle transports the propane to the customer. The transport vehicle delivers the propane from the transport vehicle to the customer. A Coriolis flowmeter measures a mass flow rate of the propane as transport vehicle delivers the propane to the customer. The Coriolis flowmeter determines a gross volume of the propane based on the mass flow rate of the propane. The Coriolis flowmeter also determines an adjusted volume of the propane based on the mass flow rate and a constant value. The constant value corresponds to a density of propane at a reference temperature.

17 Claims, 4 Drawing Sheets

PROPANE MEASUREMENT USING A CORIOLIS FLOWMETER

BACKGROUND OF THE INVENTION

1. Field of the Invention

The invention is related to the field of mass flowmeter systems, and in particular, to a method of measuring propane using a mass flow rate from a Coriolis flowmeter.

2. Statement of the Problem

Approximately 36,000 bobtail trucks operate on United States highways and in airports to deliver various fuels. A sale or custodial transfer typically occurs whenever fuels are offloaded from these trucks or trailers. Typically, positive displacement metering devices are installed to measure volumes of materials that are offloaded from these trucks.

At present, only positive displacement meters have obtained government approval for fuel delivery sales. Other types of meters have either not been tested to ascertain whether they are capable of withstanding the rigors of roadable use or they have commonly failed under conditions of such use.

Bobtail trucks are used to transport liquid petroleum gas or LPG products. The most common form of LPG is propane. Propane results from the process of refining crude oil, as well as the processing of natural gas. Propane and other forms of LPG are often stored underground in salt domes, anticlines, and other geologic formations until they are needed. Bobtail trucks are used to transport the LPG to remote points of use, e.g., to rural houses having propane tanks where the propane is used for heating, automotive propane fueling stations, or to neighborhood distribution points for filling propane tanks that are used in residential barbeques and the like. Propane is preferred because it becomes liquid at low pressures, which are typically less than 150 psia. Unfractionated natural gas may also be used in these devices, but natural gas requires storage at significantly greater pressures which can result in catastrophic failure of metal storage vessels.

A problem arises in these sales due to variations in volume that derive from different temperatures and pressures. When measured sales volumes are corrected for these effects, it is most often the case that only temperature effects are corrected. Temperature correction is normally accomplished by using standard published data from the American Petroleum Institute, e.g., Table 24 Volume Reduction to 60° F., Petroleum Measurement Tables: API Standard: 2450 (ASTM Designation D:1250) 1952 American Ed.

Despite common practice of correcting only for temperature on the assumption that liquids are essentially incompressible at low pressures around 150 psi, LPG remains highly compressible even in liquid form at these pressures. Conventional positive displacement meters are insensitive to changes in pressure and temperature that affect measurement accuracy relative to standard conditions, e.g., at 60° F. and 150 psia for propane. Conventional positive displacement meters can measure a volume of displaced liquid, but there is insufficient information available to convert the volume to a standard volume, i.e., a corresponding volume at standard pressure and temperature conditions.

Positive displacement meters often break or fail under field conditions. For example, propane is a notoriously poor lubricant, and the positive displacement meters that are used to deliver propane simply wear out quickly as a consequence of poor lubrication in the intended environment of use. Particles in the materials being delivered can jam the moving parts of positive displacement meters, which then demonstrate measurement error. Furthermore, the positive displacement meters are insensitive to changes in pressure, temperature, and fluid density in the materials being delivered. These conditions combine to provide an unacceptably high meter uncertainty in the field.

Mass flowmeters are not often used in these applications, in part, because they have not yet obtained the requisite regulatory approvals. Another reason why mass flowmeters have not been used in this intended environment of use is the fact that they measure mass, as opposed to volume, where the sales must take place in terms of volume. Some types of mass flowmeters, especially Coriolis flowmeters are capable of being operated in a manner that performs a direct measurement of density, and volume is obtainable as the quotient of mass over density. For example, U.S. Pat. No. 4,872,351 describes a net oil computer that uses a Coriolis flowmeter to measure the density of an unknown multiphase fluid. U.S. Pat. No. 5,687,100 describes a Coriolis-effect densitometer that corrects the density readings for mass flow rate effects in a mass flowmeter operating as a vibrating tube densitometer.

Coriolis flowmeters measure mass flow and other information for materials flowing through a conduit. Such flowmeters are disclosed in U.S. Pat. Nos. 4,109,524, 4,491,025, and Re. 31,450. Coriolis flowmeters have one or more flow tubes of a straight or curved configuration. Information regarding the characteristics of material flowing in a Coriolis mass flowmeter must be derived with great accuracy because it is often a requirement that the derived flow rate information have an error of less than 0.15%.

Coriolis flowmeter output signals are sinusoidal and are displaced in time or phase by an amount determined by the Coriolis forces that are generated by the flowmeter through which the material flows. The signal processing circuitry which receives these sensor output signals measures this time difference with precision and generates the desired characteristics of the flowing process material to the required error of less than 0.15%.

Agencies that regulate the sale and delivery of propane require the delivering entity to provide both a gross volume and an adjusted volume (which may also be referred to as a net volume). The regulatory agency uses the gross volume to test the accuracy of the flowmeter and grant or deny approval of the flowmeter based on the accuracy.

When delivering to a customer, the flowmeter system, such as a positive displacement meter, measures and provides a gross volume. The flowmeter system then adjusts the gross volume based on one or more factors to get the adjusted volume. Unfortunately, if the calibration of the flowmeter is off or the flowmeter is damaged, the error produced by the flowmeter becomes compounded when the adjusted volume is calculated based on the gross volume. This could result in unacceptable errors in the volume measurements of propane.

SUMMARY OF THE SOLUTION

The invention helps solve the above problems by determining an adjusted volume of propane directly from a mass flow rate from a Coriolis flowmeter. Determining the adjusted volume from the mass flow rate advantageously results in more information, less maintenance, and greater accuracy. Coriolis flowmeters advantageously withstand the rigors of roadable use and do not wear out in the manner of prior meters.

One example of the invention comprises a method of delivering the propane to a customer. A transport vehicle transports the propane to the customer. The transport vehicle delivers the propane from the transport vehicle to the customer. A Coriolis flowmeter measures a mass flow rate of the propane as a transport vehicle delivers the propane to the customer. The Coriolis flowmeter determines a gross volume of the propane based on the mass flow rate of the propane and provides the gross volume. The Coriolis flowmeter also determines an adjusted volume of the propane based on the mass flow rate and a constant value, and provides the adjusted volume. The constant value corresponds to a density of the propane at a reference temperature.

Another example of the invention comprises an alternative method of delivering the propane to a customer. A transport vehicle transports the propane to the customer. The transport vehicle delivers the propane from the transport vehicle to the customer. The Coriolis flowmeter measures a mass flow rate of the propane as the transport vehicle delivers the propane to the customer. The Coriolis flowmeter determines an adjusted volume of the propane based on the mass flow rate and a constant value and provides the adjusted volume. The constant value corresponds to a density of the propane at a reference temperature.

One aspect of the invention comprises a method of delivering propane, said method comprising the steps of:

transporting said propane to a customer using a transport vehicle;

delivering said propane from said transport vehicle to said customer;

measuring a mass flow rate of said propane with a Coriolis flowmeter as said propane is being delivered from said transport vehicle to said customer;

determining a gross volume of said propane based on said mass flow rate and providing said gross volume; and determining an adjusted volume of said propane based on said mass flow rate and a constant value and providing said adjusted volume, wherein said constant value corresponds to a density of propane at a reference temperature.

Preferably, the method further comprises the step of adjusting said constant value through a programming interface.

Preferably, adjusting said constant value comprises adjusting said constant value based on a density of propane recognized by said regulatory agency.

Preferably, adjusting said constant value comprises adjusting said constant value based on a density of propane recognized by a region of a country.

Preferably, adjusting said constant value comprises adjusting said constant value based on a density of propane recognized by a state.

Preferably, adjusting said constant value comprises adjusting said constant value based on the quality of said propane.

Preferably, wherein said gross volume is for satisfying a requirement of a regulatory agency for propane delivery.

Preferably, said reference temperature comprises approximately 60 degrees Fahrenheit.

Preferably, the method further comprises the step of generating a bill for said propane based on said adjusted volume.

Another aspect of the invention comprises a method of delivering propane, said method comprising the steps of:

transporting said propane to a customer using a transport vehicle;

delivering said propane from said transport vehicle to said customer;

measuring a mass flow rate of said propane with a Coriolis flowmeter as said propane is being delivered from said transport vehicle to said customer; and determining an adjusted volume of said propane based on said mass flow rate and a constant value, wherein said constant value corresponds to a density of propane at a reference temperature.

Preferably, the method further comprises the step of entering said constant value.

Preferably, entering said constant value comprises entering said constant value based on a density of propane recognized by a regulatory agency.

Preferably, entering said constant value comprises entering said constant value based on a density of propane recognized by a region of a country.

Preferably, entering said constant value comprises entering said constant value based on a density of propane recognized by a state.

Preferably, entering said constant value comprises entering said constant value based on the quality of said propane.

Preferably, said reference temperature comprises approximately 60 degrees Fahrenheit.

Preferably, the method further comprises the step of generating a bill for said propane based on said adjusted volume.

DESCRIPTION OF THE DRAWINGS

The same reference number represents the same element on all drawings.

DETAILED DESCRIPTION OF THE INVENTION

Figure 1:
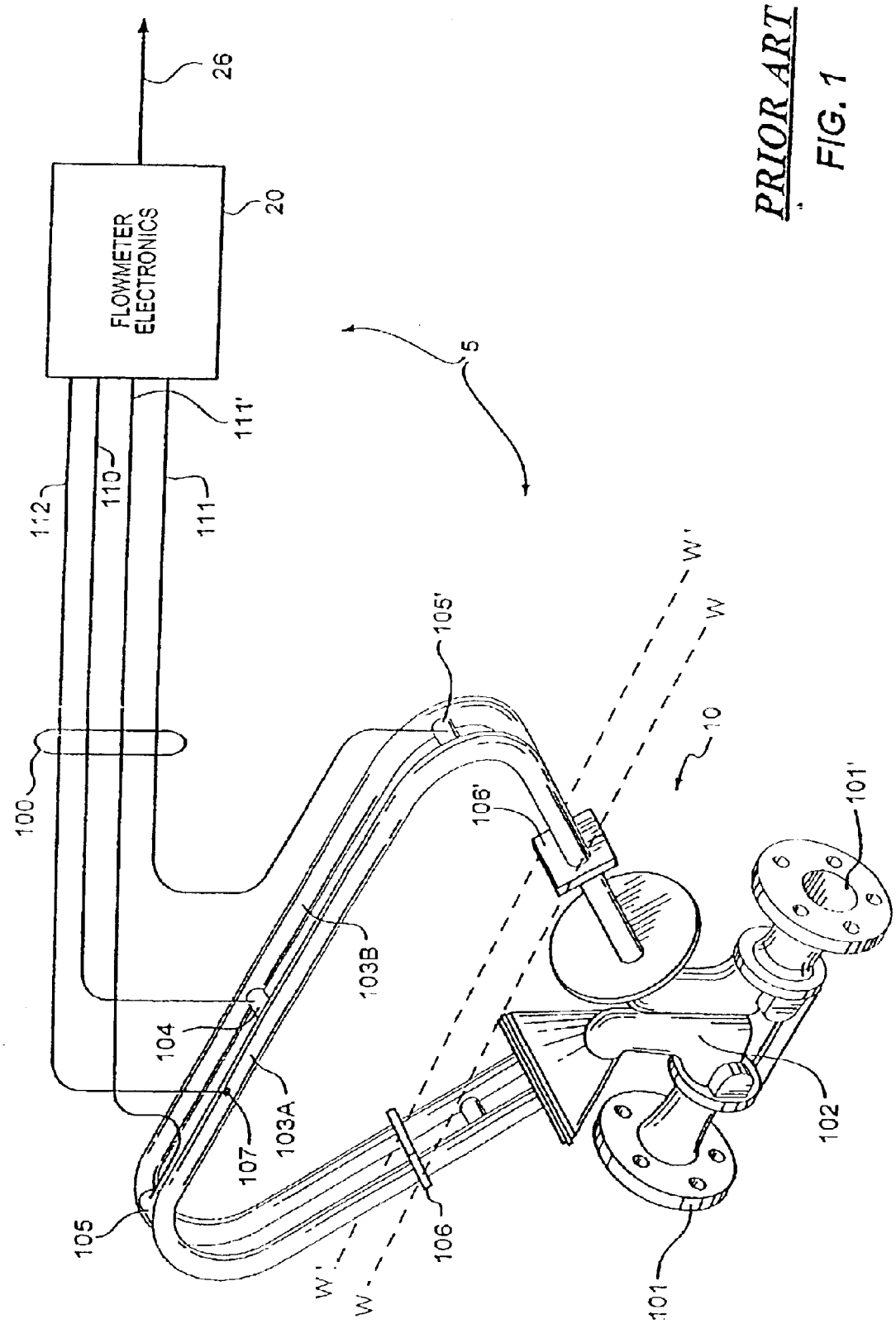
FIG. 1 illustrates a Coriolis flowmeter in the prior art.

FIG. 1 illustrates a prior art Coriolis flowmeter to help better understand the invention. FIGS. 2–5 and the following description depict specific examples of the invention to teach those skilled in the art how to make and use the best mode of the invention. For the purpose of teaching inventive principles, some conventional aspects of the invention have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Prior Art Coriolis Flowmeter—FIG. 1

FIG. 1 illustrates a Coriolis flowmeter 5 in the prior art. Coriolis flowmeter 5 comprises a Coriolis flowmeter sensor 10 and Coriolis flowmeter electronics 20. Flowmeter electronics 20 is connected to flowmeter sensor 10 via path 100 to provide for mass flow rate, density, volume flow rate, totalized mass flow information, and other information over path 26. A variety of commercially available Coriolis flowmeters providing these measurements may be purchased from Micro Motion of Boulder, Colo.

Flowmeter sensor 10 includes a pair of flanges 101 and 101', manifold 102, and flow tubes 103A and 103B. Connected to flow tubes 103A and 103B are driver 104, pick-off sensors 105 and 105', and temperature sensor 107. Brace bars 106 and 106' serve to define the axis W and W' about which each flow tube 103A and 103B oscillates.

When flowmeter sensor 10 is inserted into a pipeline system (not shown in FIG. 1) which carries a material that is being measured, the material enters flowmeter sensor 10 through flange 101, passes through manifold 102 where the material is directed to enter flow tubes 103A and 103B, flows through flow tubes 103A and 103B and back into manifold 102 from where it exits flowmeter sensor 10 through flange 101'.

Flow tubes 103A and 103B are selected and appropriately mounted to the manifold 102 to have substantially the same mass distribution, moments of inertia, and elastic modules about bending axes W—W and W'—W', respectively. The flow tubes 103A–103B extend outwardly from manifold 102 in an essentially parallel fashion.

Flow tubes 103A–103B are driven by driver 104 in opposite directions about their respective bending axes W and W' at what is termed the first out of phase bending mode of the flowmeter. Driver 104 may comprise any one of many well known arrangements, such as a magnet mounted to flow tube 103A and an opposing coil mounted to flow tube 103B and through which an alternating current is passed for vibrating both flow tubes. A suitable drive signal is applied by flowmeter electronics 20, via lead 110, to driver 104.

Pick-off sensors 105 and 105' are affixed to at least one of flow tubes 103A and 103B on opposing ends of the flow tube to measure oscillation of the flow tubes. As flow tubes 103A–103B vibrate, pick-off sensors 105-105' generate a first pick-off signal and a second pick-off signal. The first and second pick-off signals are applied to leads 111 and 111'.

Temperature sensor 107 is affixed to at least one of flow tubes 103A and 103B. Temperature sensor 107 measures the temperature of the flow tube in order to modify equations for the temperature of the system. Path 112 carries temperature signals from temperature sensor 107 to flowmeter electronics 20.

Flowmeter electronics 20 receive the first and second pick-off signals appearing on leads 111 and 111', respectively. Flowmeter electronics 20 process the first and second pick-off signals to compute the mass flow rate, the density, or other property of the material passing through flowmeter sensor 10. This computed information is applied by meter electronics 20 over path 26 to a utilization means (not shown in FIG. 1).

Figure 2:
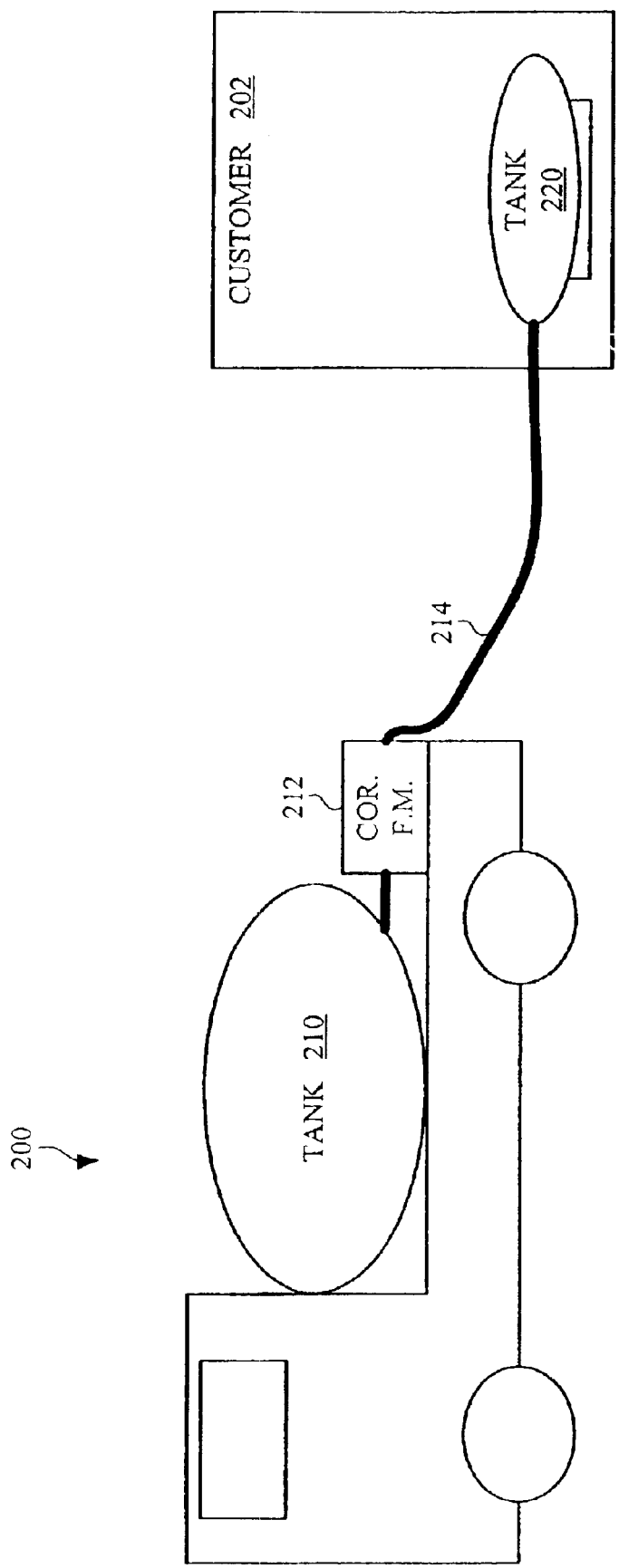
FIG. 2 illustrates a transport vehicle for delivering propane to a customer in an example of the invention.
Figure 3:
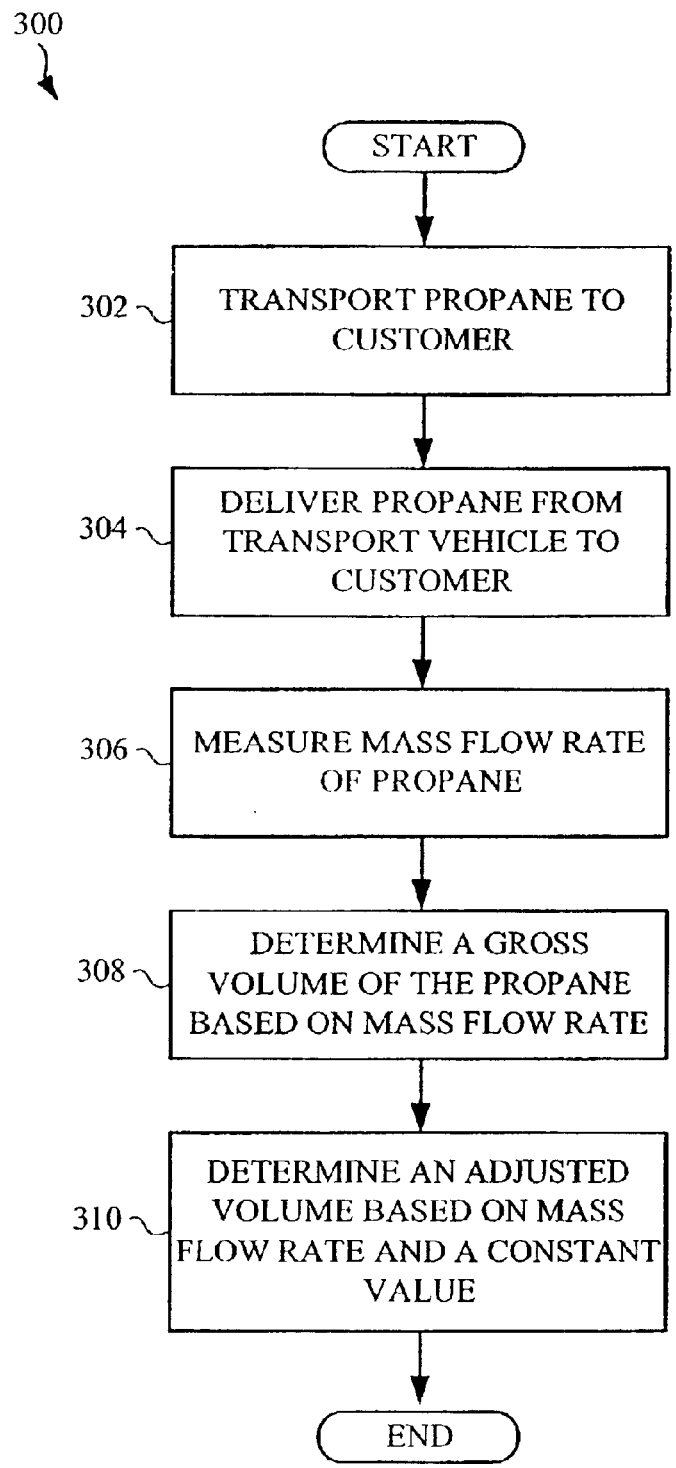
FIG. 3 is a flow chart illustrating a method of delivering propane in an example of the invention.
Figure 4:
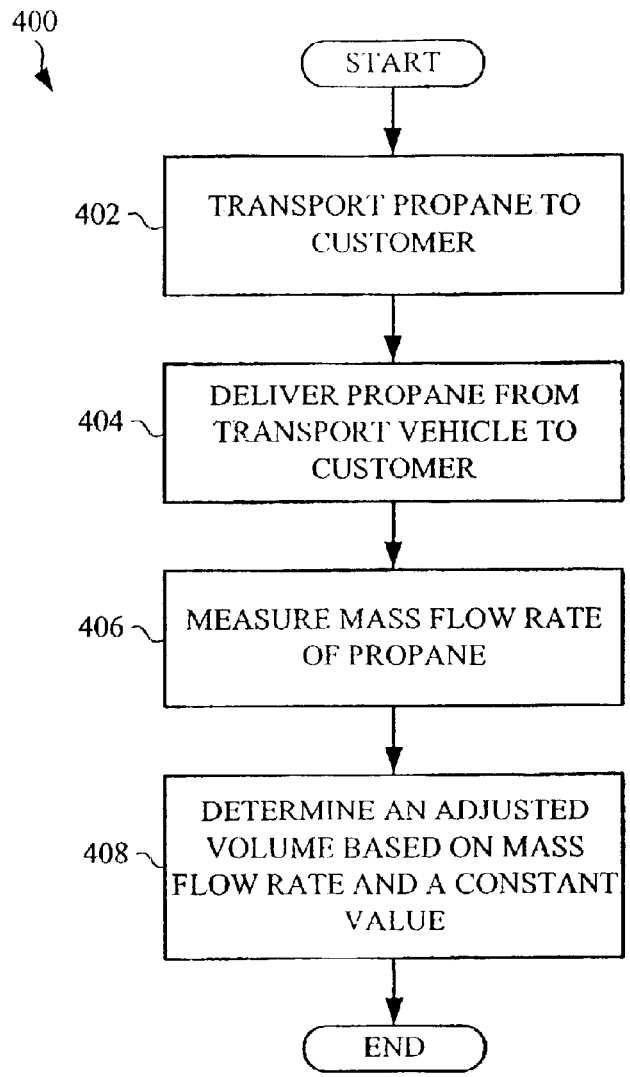
FIG. 4 is a flow chart illustrating another method of delivering propane in an example of the invention.

Propane Delivery—FIGS. 2–4

FIG. 2 illustrates a transport vehicle 200 for delivering propane to a customer 202 in an example of the invention. Transport vehicle 200 comprises a propane tank 210, a Coriolis flowmeter 212, and a hose 214. Transport vehicle 200 could also include a pump, filters, valves, a calibration system, or other features which are left out for the sake of brevity. Customer 202 includes a propane tank 220. Hose 214 couples to propane tank 220 to deliver propane from tank 210 to tank 220.

The following definitions may be helpful in understanding the invention(s). A transport vehicle comprises any vehicle capable of transporting propane, such as a bobtail truck, a tractor-trailer, etc. A customer comprises any person or entity that receives delivery of propane. A regulatory agency comprises any individual or group that passes, enforces, or interprets any law, rule, or guideline involving the sale or trade of propane. One example of a regulatory agency is the Department of Agriculture of a state.

FIG. 3 illustrates a method 300 of delivering propane to customer 202 of FIG. 2. In step 302, transport vehicle 200 transports the propane to customer 202. Transporting the propane may involve driving transport vehicle 200 on roads to get to the location of customer 202. Transport vehicle 200 delivers the propane from transport vehicle 200 to customer 202 in step 304. Delivering the propane may involve connecting hose 214 to tank 220 and initiating a flow of the propane from tank 210 to tank 220. In step 306, Coriolis flowmeter 212 measures a mass flow rate of the propane as transport vehicle 200 delivers the propane to customer 202. Coriolis flowmeter 212 determines a gross volume of the propane based on the mass flow rate of the propane in step 308. In some examples, Coriolis flowmeter 212 may also measure a density of the propane being delivered, and determine the gross volume based on the mass flow rate and the measured density of the propane. The gross volume may be for satisfying a requirement of a regulatory agency for propane delivery. For instance, the Department of Agriculture in a state may require that all propane delivery units be able to provide a gross volume measurement. Coriolis flowmeter 212 provides the gross volume. Providing the gross volume may involve displaying the gross volume through an interface, printing the gross volume, or transferring the gross volume to another system.

Coriolis flowmeter 212 also determines an adjusted volume of the propane based on the mass flow rate and a constant value in step 310. The constant value corresponds to a density of propane at a reference temperature. The reference temperature may be 60 degrees Fahrenheit. Coriolis flowmeter 212 provides the adjusted volume. Providing the adjusted volume may involve displaying the adjusted volume through an interface, printing the gross volume, or transferring the gross volume to another system. Based on this disclosure, those skilled in the art will appreciate how to modify existing propane delivery methods to perform method 300.

In one example of the invention, the constant value comprises a reference density at a reference temperature recognized by a regulatory agency, a state, or a region of a country, such as the United States. For instance, New York state may recognize a reference density of 509 kg/m$^3$ at 60 degrees Fahrenheit for propane, while California may recognize a reference density of 510 kg/m$^3$ at 60 degrees Fahrenheit for propane.

In another example of the invention, the seller of the propane delivered by transport vehicle 200 may generate a bill for the propane based on the adjusted volume determined by Coriolis flowmeter 212. The seller then sends the bill to customer 202.

FIG. 4 illustrates an alternative method 400 of delivering the propane to customer 202. In step 402, transport vehicle 200 transports the propane to customer 202. Transport vehicle 200 delivers the propane from transport vehicle 200 to customer 202 in step 404. Delivering the propane may involve connecting hose 214 to tank 220 and initiating a flow of the propane from tank 210 to tank 220. In step 406, Coriolis flowmeter 212 measures a mass flow rate of the propane as transport vehicle 200 delivers the propane to customer 202. Coriolis flowmeter 212 determines an adjusted volume of the propane based on the mass flow rate and a constant value in step 408. The constant value corresponds to a density of propane at a reference temperature. Coriolis flowmeter 212 provides the adjusted volume. Providing the adjusted volume may involve displaying the adjusted volume through an interface, printing the adjusted volume, or transferring the adjusted volume to another system. Based on this disclosure, those skilled in the art will appreciate how to modify existing propane delivery methods to perform method 400.

Figure 5:
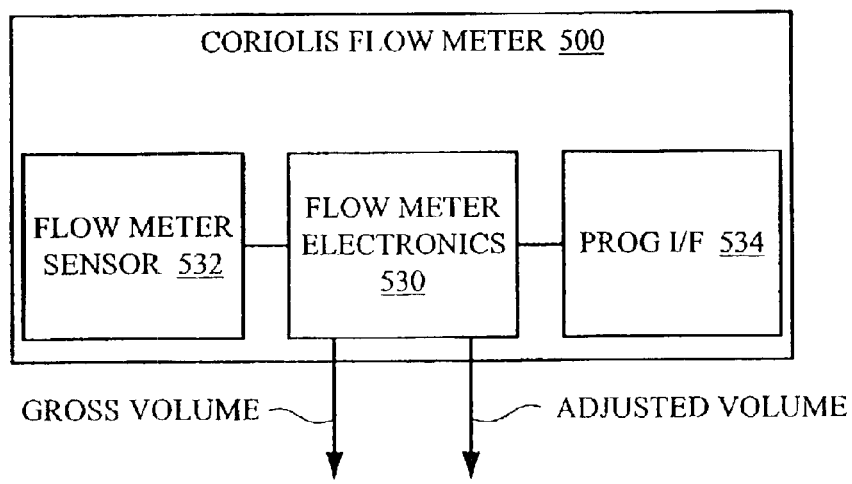
FIG. 5 illustrates a Coriolis flowmeter in an example of the invention.

Coriolis Flowmeter—FIG. 5

FIG. 5 illustrates a block diagram of a Coriolis flowmeter 500 in an example of the invention. Coriolis flowmeter 500 is comprised of flowmeter electronics 530, flowmeter sensor 532, and programming interface 534. Flowmeter sensor 532 may be similar to flowmeter sensor 10 in FIG. 1. When the propane is flowing through flowmeter sensor 532, flowmeter electronics 530 is configured to receive pick off signals from the flowmeter sensor 532. Flowmeter electronics 530 is further configured to process the pick off signals to determine a mass flow rate of the propane. Flowmeter electronics 530 is further configured to determine a gross volume of the propane based on the mass flow rate of the propane. Flowmeter electronics 530 is further configured to determine an adjusted volume of the propane based on the mass flow rate and a constant value.

Programming interface 534 allows a user to enter the constant value or adjust the constant value used by flowmeter electronics 530 to determine the adjusted volume. The user may want to adjust the constant value for a number of reasons. For instance, a regulatory agency, or a state or region of the country may recognize a certain reference density for propane at a reference temperature. In such a case, the user may adjust the constant value based on the reference density for that area using programming interface 534. The user may also want to adjust the constant value based on the quality of the propane being delivered. The user may also adjust the constant value to calibrate Coriolis flowmeter 500.

What is claimed is:

1. A method of delivering propane, said method comprising the steps of:
   transporting said propane to a customer using a transport vehicle;
   delivering said propane from said transport vehicle to said customer;
   measuring a mass flow rate of said propane with a Coriolis flowmeter as said propane is being delivered from said transport vehicle to said customer;
   determining a gross volume of said propane based on said mass flow rate and providing said gross volume; and
   determining an adjusted volume of said propane based on said mass flow rate and a constant value and providing said adjusted volume, wherein said constant value corresponds to a density of propane at a reference temperature.

2. The method of claim 1 further comprising the step of:
   adjusting said constant value through a programming interface.

3. The method of claim 2 wherein adjusting said constant value comprises:
   adjusting said constant value based on a density of propane recognized by a regulatory agency.

4. The method of claim 2 wherein adjusting said constant value comprises:
   adjusting said constant value based on a density of propane recognized by a region of a country.

5. The method of claim 2 wherein adjusting said constant value comprises:
   adjusting said constant value based on a density of propane recognized by a state.

6. The method of claim 2 wherein adjusting said constant value comprises:
   adjusting said constant value based on the quality of said propane.

7. The method of claim 1 wherein providing said gross volume is for satisfying a requirement of a regulatory agency for propane delivery.

8. The method of claim 1 wherein said reference temperature comprises approximately 60 degrees Fahrenheit.

9. The method of claim 1 further comprising the step of:
   generating a bill for said propane based on said adjusted volume.

10. A method of delivering propane, said method comprising the steps of:
    transporting said propane to a customer using a transport vehicle;
    delivering said propane from said transport vehicle to said customer;
    measuring a mass flow rate of said propane with a Coriolis flowmeter as said propane is being delivered from said transport vehicle to said customer; and
    determining an adjusted volume of said propane based on said mass flow rate and a constant value, wherein said constant value corresponds to a density of propane at a reference temperature.

11. The method of claim 10 further comprising the step of:
    entering said constant value through a programming interface.

12. The method of claim 11 wherein entering said constant value comprises:
    entering said constant value based on a density of propane recognized by a regulatory agency.

13. The method of claim 11 wherein entering said constant value comprises:
    entering said constant value based on a density of propane recognized by a region of a country.

14. The method of claim 11 wherein entering said constant value comprises:
    entering said constant value based on a density of propane recognized by a state.

15. The method of claim 11 wherein entering said constant value comprises:
    entering said constant value based on the quality of said propane.

16. The method of claim 10 wherein said reference temperature comprises approximately 60 degrees Fahrenheit.

17. The method of claim 10 further comprising the step of:
    generating a bill for said propane based on said adjusted volume.

* * * * *